Dec. 5, 1961     T. A. DWORAK     3,011,930
LAMINATED QUILTED MATERIAL AND METHOD
OF MAKING THE SAME
Filed March 25, 1960

INVENTOR.
THEODORE A. DWORAK
BY William F. Woods
ATTORNEY

United States Patent Office 3,011,930
Patented Dec. 5, 1961

3,011,930
LAMINATED QUILTED MATERIAL AND
METHOD OF MAKING THE SAME
Theodore A. Dworak, 703 Sherburne Ave.,
St. Paul, Minn.
Filed Mar. 25, 1960, Ser. No. 17,618
6 Claims. (Cl. 154—46)

This invention relates to laminated quilted material and the method of making the same. In particular, the invention concerns novel methods for converting thermoplastic material such as polyethylene into laminated quilted material having air filled pockets therein and the resulting articles.

Thermoplastic material has been employed in the fabrication of padded laminated material wherein an inner layer of wadding material such as cotton, wool and the like has been fused between outer layers of thermoplastic material such as polystyrene, polyethylene or cellulose acetate sheeting. The resulting article, while satisfactory for a great many important purposes, has several shortcomings including its weight, bulkiness and general resistance to facile handling and storage.

It is, therefore, a broad object of this invention to provide an improved laminated quilted material.

Another broad object of this invention is to provide a simple and efficient method of making laminated quilted material.

Yet another object of this invention is to provide a method of fusing together spaced thermoplastic sheets in such a manner as to provide a pattern of air enclosed pockets therein.

A further object of this invention is to provide in a method for fabricating laminated thermoplastic material novel steps for forming air pockets in said material.

Another object of this invention is to provide a novel laminated quilted structure of thermoplastic material.

Yet another object of this invention is to provide a novel method of fabricating a quilted perforated air cushion of thermoplastic material.

Another object of this invention is to provide a novel method of forming air cushions from thermoplastic material.

Still another object of this invention is to provide a novel air cushion that is easy to manufacture, low in cost and efficient in function.

Another object of this invention is to provide a method for converting tubular thermoplastic material into quilted laminated material without adding material thereto.

Yet another object of this invention is to provide a new and improved article for inserting into containers and the like for protective cushioning of items therein.

Another object of this invention is to provide a simple and efficient packaging insert for containers.

A further object of this invention is to provide a lightweight, easily fabricated, cushioning article that can be removably installed in containers for protecting articles therein from shock.

Another object of this invention is to provide a novel method for fabricating cushioning inserts for containers.

These and other objects and advantages of the invention will become apparent from a consideration of the following detailed description and accompanying drawing wherein the invention and various methods of its manufacture are set forth by way of illustration only.

Figure 1:
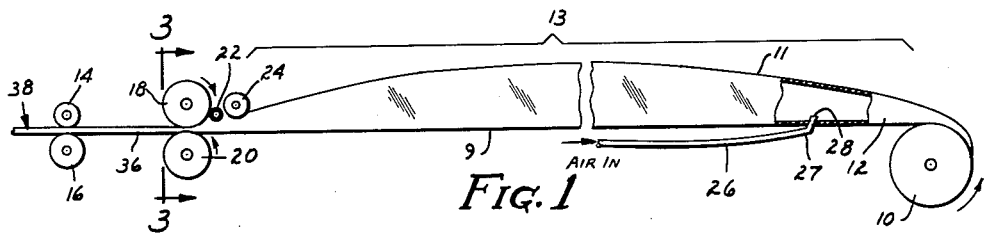
FIGURE 1 is a diagrammatic elevational view illustrating apparatus that may be used in carrying out the methods disclosed herein.

Referring to FIGURE 1 of the drawing, the apparatus for carrying out the invention comprises a supply roll 10 having wound thereon an elongated tubular web 12 of thermoplastic material such as polyethylene. Supply roll 10 is located at one end of an elongated support structure (not shown) which may be in the order of 50–100 feet in length to provide efficient large scale production of the resulting articles. At the opposite end of the support structure are a pair of delivery rolls 14 and 16 which serve to impart horizontal longitudinal movement to web 12 as it moves from supply roll 10. Intermediate supply roll 10 and delivery rolls 14, 16 are a pair of pressing and heating rolls 18, 20, which are positioned relatively close to the delivery rolls 14, 16, as indicated in FIGURE 1. Rolls 22 and 24, of lesser diameter than rolls 18, 20, are positioned adjacent the entrance or upstream side of pressing and heating rolls 18, 20 to guide web 12 into the heating and pressing operation and to squeeze the excess air from the forward end of the inflated tubular segment 13 of web 12 as it moves along between supply roll 10 and the heating and pressing rolls 18 and 20.

A slender flexible elongated air hose 26, substantially equal in length to the distance between supply roll 10 and heating and pressing rolls 18, 20, is connected to an external source of air pressure (not shown) and allowed to reside in an underlying manner with respect to the lower horizontal wall 9 of web 12. At the free end 27 of hose 26 a hook type nozzle 28 (preferably of plastic or similar non-cutting material) is provided having a relatively sharp end. Nozzle 28 is inserted into the lower wall 9 of web 12 by piercing the wall with the sharp end thereof and is then hooked in place so that the entire hose assembly 26—28 travels with web 12 as it moves from supply roll 10 to the heating and pressing rolls 18 and 20 at the opposite end of the supporting structure.

Figure 2:
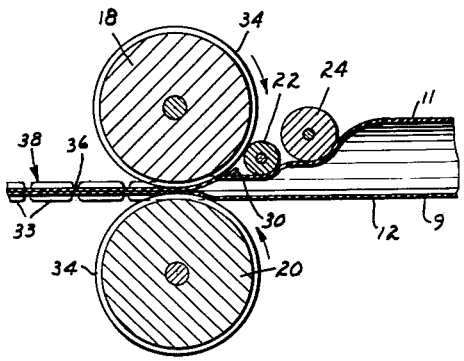
FIGURE 2 is an enlarged fragmentary sectional view showing the operation of the rolls used in the process.
Figure 3:
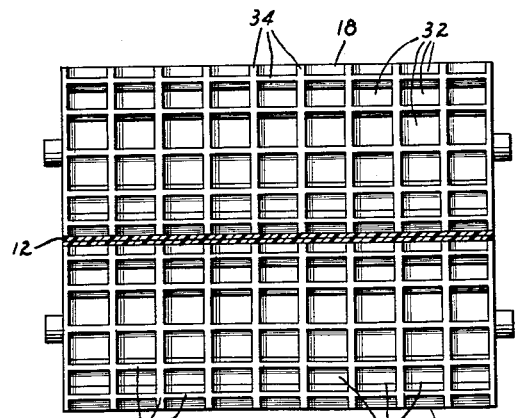
FIGURE 3 is an enlarged elevational view illustrating the rolls for applying heat and pressure taken on the line 3—3 of FIGURE 1.

FIGURES 2 and 3 illustrate in detail the construction and arrangement of the apparatus used in the heating and pressing step of the method disclosed herein. In FIGURE 2 a stationary guide member 30 is shown disposed between inner guide roll 22 and upper heating and pressure roll 18. Outer guide roll 24 is of slightly larger diameter than inner guide roll 22 to facilitate a gradual reduction in the cross-sectional area of the inflated segment 13 of web 12 as it enters the heating and pressing position. Rolls 22, 24, and guide member 30 also keep the upper wall 11 of web 12 from contact with the outer surface of the heated roll 18 before its entrance into the working zone between rolls 18 and 20.

The heating and pressure rolls 18 and 20 may have any desired design configuration on their outer surfaces which may be impressed upon web 12 as it moves therebetween. FIGURE 3 discloses a common geometric shape that has been found to be entirely suitable for most purposes. The manner of heating rolls 18 and 20 is well known in the art and includes such means as providing a high frequency current which passes through the mating ribs on adjacent rolls to generate sufficient heat to fuse the thermoplastic material therebetween. Other well known means that may be used are steam cylinders having a special joint which permits the steam to heat the outer shell and then be returned in the form of condensate to an exhaust header and infra red or radiant heating of the web as it passes through the contact zone between rolls 18 and 20.

In the operation of the apparatus shown in FIGURE 1 the web 12 is drawn from supply roll 10, threaded through heating and pressure rolls 18, 20 and into delivery rolls 14 and 16. Nozzle 28 of hose 26 is inserted into the lower wall 9 of web 12 adjacent supply roll 10, by piercing the wall. The hooked end of nozzle 28 allows hose 26 to travel with web 12 towards heating and pressure rolls 18 and 20. Air under slight pressure is admitted to hose 26 resulting in the inflation of web 12 along its entire length between roll 10 and rolls 18 and 20. This action causes an enlarged tubular segment 13 to form having a tendency to separate the upper wall 11 from the lower wall 9 of web 12 as it leaves supply roll 10. The volume and pressure of the air admitted within web 12 varies according to the length of the inflated segment 13 but need only be sufficient to cause a well-defined cross-sectional enlargement of web 12. The amount of air required for efficient operation is minimized by the action of guide rolls 22 and 24 which force a large percentage of the air in segment 13 of web 12 toward supply roll 10. Only that amount of air defined by the spatial content of the designs embossed on the heating and pressing rolls 18 and 20 is allowed to escape from tube 13. It is apparent that as the separated walls 9 and 11 of web 12 converge below guide rolls 22 and 24 a small amount of air is carried therebetween which is trapped in the individual cells or spaces 32 defined by the projecting and mating ribs 34 on rolls 18 and 20 as the walls 9 and 11 are heated and pressed together as at 36 thereby forming a fused quilted laminated continuous blanket or sheet.

When hose 26 is carried along approximately the entire length of the supporting structure between supply roll 10 and heating and pressing rolls 18, 20 and reaches the vicinity of rolls 18 and 20, the nozzle 28 thereof is removed and again inserted at a point downstream from and closely adjacent to supply roll 10. The small aperture left by removing nozzle 28 may be easily patched with suitable adhesive material and the entire operation resumed.

Figure 5:
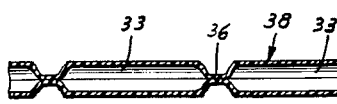
FIGURE 5 is an enlarged sectional elevational view, partly broken away, taken on the line 5—5 of FIGURE 4.

The resulting structure is a continuous laminated sheet 38 having a pattern of air enclosed pockets 33. As shown in FIGURE 5, the fused areas 36 are surrounded by air filled cavities 33 to provide a light material having insulating and other functional properties. Subsequent to the passage of sheet 38 through delivery rolls 14, 16 it may be severed into individual lengths according to the particular end use that is required.

Another method for forming sheets of the character described would be to superpose elongated sheets of thermoplastic material on each other, seal all but one edge thereof and then inject air under pressure into the open end so as to form a tubular segment similar to the one set forth in FIGURE 1. However, the previous method employing a tubular web of thermoplastic material is simpler to perform and requires less elaborate apparatus for its function.

Figure 6:
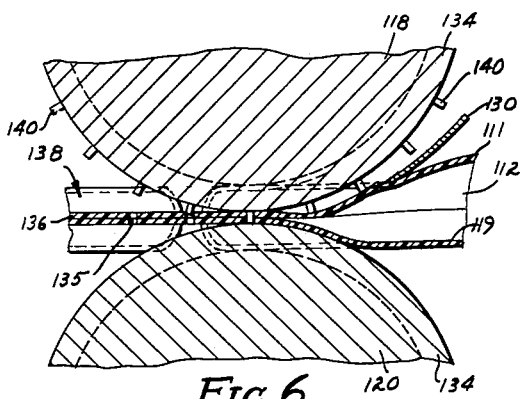
FIGURE 6 is an enlarged fragmentary view of a modified form of the rolls used for applying heat and pressure.
Figure 7:
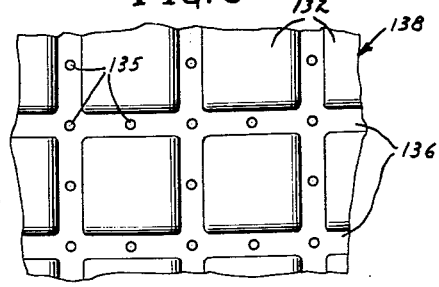
FIGURE 7 is an enlarged fragmentary plan view of the material produced by the rolls shown in FIGURE 6.
Figure 4:
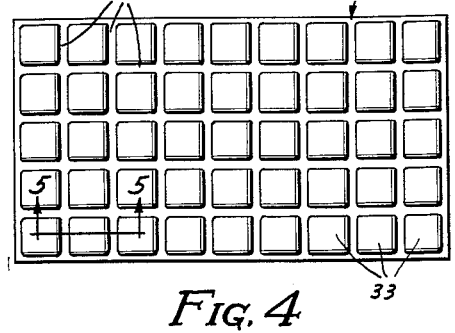
FIGURE 4 is an enlarged plan view showing the resulting article.

FIGURES 6 and 7 disclose an alternate way of producing a quilted laminated air enclosed sheet 138, which is characterized by having spaced perforations 135 formed along the fused areas 136. Pockets or cavities 132 are provided as in the structure previously described. This particular perforated design has certain advantages over the solid construction illustrated in FIGURES 4 and 5, in that it allows the passage of air and moisture therethrough thereby preventing sweating and the accumulation of moisture. A typical use for such a product would be in the packaging field where units of this type are employed as fillers or inner packing members. The article shown in FIGURE 7 is fabricated by providing spurs 140 on roller 118 which pierce sheet 138 along the fused areas 136 as it passes through the working zone.

The quilted laminated sheets that are produced by the foregoing processes may be cut into desired shapes to suit any intended purpose. The thickness of the air pockets may be varied by proper design of the heating and pressure rolls and by adjustment of the guide rolls. For use as packaging inserts to provide a protective shock resistant filler between an article and its container the sheet may be cut to fit a particular shape or size. By releasing air from individual pockets variations in thickness and weight may be provided.

Thus there has been shown and described a new and improved method for forming laminated quilted air enclosed thermoplastic material and the resulting article. Although the invention has been set forth with a certain degree of particularity it is not meant to be limited thereby, the scope of the invention being limited only by the appended claims.

I claim:

1. The method of making laminated quilted material including the steps of supplying air to an elongated tubular sheet of thermoplastic material to slightly inflate the same, applying heat and pressure at spaced intervals to said sheet whereby to trap air in predetermined areas therein, perforating said sheet between said predetermined areas, and cutting said sheet into desired lengths.

2. The method of making laminated quilted air cushions and the like of thermoplastic material comprising cutting a tubular elongated piece of thermoplastic material into a predetermined length, sealing one end of said predetermined length of thermoplastic material, forcing air under pressure into the open end of said predetermined length of thermoplastic material, applying heat and pressure to said material to form a plurality of spaced air enclosed walls along said material, and perforating said material along the area to which heat and pressure have been applied.

3. The method of making laminated thermoplastic material for insulating and like purposes comprising the steps of superposing two elongated sheets of thermoplastic material on each other, sealing all but one edge of said sheets together to form an elongated tube having a closed end, injecting air under pressure within said tube, applying heat and pressure to said tube at predetermined successive areas to form a series of air enclosed areas along said tube, and perforating said tube between the air enclosed areas thereof.

4. The method of making laminated thermoplastic material comprising the steps of supplying air to an elongated tube of thermoplastic material, applying heat and pressure to successive selected areas on said tube to form a series of spaced air enclosed areas thereon, and perforating said tube between the air enclosed areas thereof.

5. A continuous flexible laminated sheet material comprising two opposite flexible layers of thermoplastic material having fused layers of relatively narrow width bounded by air filled spaced apart layers, said fused layers having spaced perforations therein.

6. A packaging insert for holding articles firmly in a container comprising an inner layer of thermoplastic material, and an outer layer of thermoplastic material, said inner layer and outer layer of thermoplastic material being fused together at spaced intervals whereby to form a series of air filled pockets adapted to cushion and protect articles within a container, said inner and outer layer of thermoplastic material having perforations along the fused areas thereof.

References Cited in the file of this patent

UNITED STATES PATENTS

| | | |
|---|---|---|
| 2,621,138 | Messing | Dec. 9, 1952 |
| 2,621,139 | Messing | Dec. 9, 1952 |
| 2,958,620 | Ono | Nov. 1, 1960 |

FOREIGN PATENTS

| | | |
|---|---|---|
| 747,105 | Great Britain | Mar. 28, 1960 |

OTHER REFERENCES

Modern Plastics, October 1943, pages 96 and 97 and article titled, "The Blowing of Plastics."